United States Patent [19]

Kabse et al.

[11] Patent Number: 5,437,879
[45] Date of Patent: Aug. 1, 1995

[54] LAYERED CHEWING GUM CONFECTION

[75] Inventors: Kishop Kabse; Walter J. Hager, both of Scarborough, Canada

[73] Assignee: Warner-Lambert Company, Morris Plains, N.J.

[21] Appl. No.: 132,063

[22] Filed: Oct. 4, 1993

[51] Int. Cl.⁶ .................................................. A23G 3/30
[52] U.S. Cl. ................................................ 426/5; 426/103
[58] Field of Search ........................................ 426/3-5, 426/103

[56] References Cited

U.S. PATENT DOCUMENTS

| | | | |
|---|---|---|---|
| 1,193,423 | 8/1916 | Pryor | 426/5 |
| 1,267,320 | 5/1918 | Fries | 426/5 |
| 4,208,431 | 6/1980 | Friello et al. | 426/3 |
| 4,217,368 | 8/1980 | Witzel et al. | 426/5 |
| 4,352,823 | 10/1982 | Cherukuri et al. | 426/5 |
| 4,352,824 | 10/1982 | Puglia et al. | 426/5 |
| 4,352,825 | 10/1982 | Cherukuri et al. | 426/5 |
| 4,399,154 | 8/1983 | Puglia et al. | 426/5 |
| 4,741,905 | 5/1988 | Huzinec | 426/3 |
| 4,806,364 | 2/1989 | Kubota et al. | 426/5 |
| 4,808,418 | 2/1989 | Zamudio-Tena et al. | 426/5 |
| 4,911,937 | 3/1990 | Crosello et al. | 426/103 |
| 4,971,806 | 11/1990 | Cherukuri et al. | 426/5 |
| 5,017,385 | 5/1991 | Weinecke | 426/5 |

*Primary Examiner*—Jeanette Hunter
*Attorney, Agent, or Firm*—Linda A. Vag

[57] ABSTRACT

A multi-layered chewing gum is prepared using layers of chewing gum sandwiched about a layer or layers of a hydrophilic gel-creme confection. The multi-layered confection affords an up-front taste sensation provided by the hydrophilic components of the gel-creme with a subsequent onset of longer lasting, sustained flavor provided by the chewing gum composition. The layered confection also provides an initial soft chewing texture which converts to that of a standard chewing gum after several minutes of chewing.

37 Claims, No Drawings

LAYERED CHEWING GUM CONFECTION

BACKGROUND OF THE INVENTION

The present invention relates generally to a novel chewing gum composition and in particular to a chewing gum-candy confection combination that provides unique flavor, texture and chew characteristics. In formulating chewing gum compositions, those skilled in the art are always striving to achieve new flavor profiles, longer lasting flavor and sweetness delivery, and variations in the chewing texture and mouthfeel which is pleasant and satisfying yet different from the everyday, ordinary chicle type gum that has been around for years.

To this end, it is an object of the present invention to provide a multi-layered chewing gum-gel creme confection that provides up front and immediate flavor perception as well as long lasting flavor and sweetness perception together with a pleasant and subtle texture change within the product that occurs during the chewing process and develops until the chewing texture becomes a single perceived texture. More specifically, the multi-layered chewing gum-gel creme confection of the present invention affords the opportunity to provide an initial delivery of multiple flavors and textures which harmoniously blend into a pleasant varied flavor, sweetness and mouthfeel perception that steadily evolves into a standard chewing gum composition.

There are a number of attempts in the art to provide varied flavor or sweetness delivery primarily by incorporating a water soluble phase and a water insoluble phase in the chewing gum composition. U.S. Pat. No. 4,208,431 to Friello et. al. discloses a chewing gum composition having prolonged sweet taste comprising an aqueous softener and a first sweetener in particulate form that together makes up the water soluble phase. Hydrogenated starch hydrosylate may optionally be added. The water-insoluble phase is comprised of a plurality of separate and distinct masses suspended in and dispersed throughout the water-soluble phase. Each of these masses comprises gum base, a second sweetener in particulate form, and optionally, hydrogenated starch hydrolysate enveloped by the gum base. The water soluble phase tends to provide immediate, up front release of flavors and sweeteners while the water-insoluble phase holds them back providing long lasting, sustained flavor and sweetener release.

U.S. Pat. No. 4,971,806 to Cherukuri et. al. teaches a chewing gum which provides flavor impact, quick flavor release, easy bite and sustained flavor release. These properties are achieved by preparing a first chewing gum composition comprising a low gum base content and a second chewing gum composition having a high base content, and combining the two compositions in a non-homogeneous manner, e.g., a chewing gum comprising multiple layers. The low base content composition contains liquid flavor and sweetener and, optionally, spray dried flavors. The gum layers are laminated together by conventional method. U.S. Pat. No. 1,267,320 issued to Fries discloses an article of confection comprising a central sheet of chewing gum and a layer on each side of the gum sheet composed of powdered sugar, the whole being rendered integral by pressure. U.S. Pat. No. 1,193,423 issued to Pyor teaches a package of chewing gum comprising a supply of neutral gum and an accompanying concentrated flavor stick.

U.S. Pat. No. 4,217,368 to Witzel et. al. discloses a chewing gum having a prolonged sweet taste consisting essentially of a water soluble phase and a relatively insoluble phase. The water soluble phase consists essentially of softener and a first sweetener in particulate form dispersed throughout the softener. The water soluble phase consists essentially of a plurality of separate and distinct masses suspended in and dispersed throughout the water soluble phase. Each of these masses comprise gum base and particles of a second sweetener enveloped by said gum base. Also disclosed is a method for forming this chewing gum.

U.S. Pat. No. 4,352,823 also issued to Cherukuri et. al. discloses a co-extruded chewing gum having a soft gum center portion. The chewing gum comprises an extruded soft gum core portion formed of chewing gum containing at least about 5% to about 10% moisture based on the weight of the core portion, and an outer shell portion formed of chewing gum having a harder consistency than the core portion. The soft core portion comprises a polyisobutylene elastomer or a mixture of medium and lower molecular weight polyisobutylene elastomers.

U.S. Pat. No. 4,352,824 issued to Puglia et. al. discloses a chewing gum containing gum base and a non-aqueous solid fatty or gelatinous sweetener or flavorant solubilized in the gum base. The chewing gum is laminated with a slab of a second chewing gum which will supply initial sweetness or flavor impact. U.S. Pat. No. 4,352,825 issued to Cherukuri et. al. discloses a co-extruded chewing gum having a soft gum center portion comprising an extruded soft gum core portion and an outer shell portion formed of chewing gum and extruded simultaneously with the core portion. The core portion contains a preformed recrystallized sweetener combination including at least two sweeteners which have been recrystallized as a mixture. The outer shell portion has a harder consistency than the core portion. U.S. Pat. No. 4,399,154 issued to Puglia et. al. discloses a co-extruded chewing gum which includes an extruded center portion surrounded by and bonded to an extruded outer shell portion. The center portion may contain increased amounts of flavor and may have a different density than the outer shell portion to provide a textural difference upon chewing.

U.S. Pat. No. 4,808,418 to Zamudio-Tena et. al. discloses a dual textured, marbleized chewing gum composition comprising both a hard gum base, a soft gum base, flavors and sweetening agents and flavors so that the consumer is provided with changes in the chew characteristics of the gum together with a change in the release of flavors and/or sweeteners over time. Those incorporated into the soft gum base are released initially providing one flavor perception while those incorporated in the hard gum base are released later. This can be made so that one flavor/sweetener combination is continually released for long lasting, sustained flavor perception or may be varied so that multiple or different flavors are perceived during the chew.

Finally, U.S. Pat. No. 4,741,905 to Huzinec discloses a chewing gum candy confection comprised of a chewing gum base that is melted and mixed with a cooked hard candy sorbitol syrup at temperatures that render the two compositions miscible to form a substantially single phase continuous plastic chewing gum candy mass. The molten mass is cooled to yield hard, homogenous candy composition which becomes chewy and gummy once bitten and chewed. The solid hard candy then, in effect, becomes a soft chewing gum. U.S. Pat. No. 5,017,385 to Wienecke also discloses a hard candy-chewing gum combination wherein the chewing gum and hard candy are discretely combined in a laminate structure where the gum and candy alternate.

None of the cited prior art however, provides a multi-layered chewing gum gel creme confection that is comprised of two phases with distinctly different textures and mouthfeel with the optional incorporation of different flavor/sweetener delivery systems. More specifically, none of the cited prior art teaches a gel cream confection sandwiched between at least two layers of chewing gum which, when chewed provides a variable texture and taste profile that may be altered in many ways. Moreover, the further use of food colors and dyes may be used to distinguish the gum from the gel layers and affords an aesthetically pleasing effect as well.

SUMMARY OF THE INVENTION

A multiple layered chewing gum gel creme confection is comprised of at least one flavored gel creme confection layer that is hydrophilic in nature sandwiched between two or more layers of chewing gum. The gum and gel may be sugared or sugarless and may deliver similar or different flavoring agents. The chewing gum layers are co-extruded about the gel creme layer and are preferably of different colors so as to provide an enhanced aesthetic appearance.

DETAILED DESCRIPTION OF THE INVENTION

The multi-layered chewing gum gel-creme confection is comprised essentially of alternate layers of a hydrophilic gel-creme composition laminated or sandwiched between multiple layers of a chewing gum. Preferably, the gum gel creme confection is comprised of one layer of a hydrophilic creme sandwiched between two layers of chewing gum. The gum layers are co-extruded about the gel-creme center but do not completely envelope it. This allows for the coloration of the gel creme that is different from that of the chewing gum for a more pleasing aesthetic appeal. The two gum layers then do not envelope the gel layer completely but rather allow its edges to be exposed thereby possessing an aesthetically appealing, laminate structure.

The chewing gum composition generally comprises one or more natural or synthetic elastomers and can be supplemented by conventional chewing gum ingredients such as one or more solvents, plasticizers, fillers, flavoring agents, coloring agents and/or sweetening agents.

Elastomers which are suitable for use herein include substance of vegetable origin such as chicle, jelutong, gutta percha, guayle and crown gum. Synthetic elastomers such as butadiene-styrene copolymers, isobutylene-isoprene copolymers, polyethylene, polyisobutylene, butyl rubber, polyvinylacetate and mixtures thereof are also useful. The elastomer generally comprises from about 14% to 50% by weight, preferably from about 20% to about 30% by weight of the chewing gum composition.

The chewing gum composition can contain elastomer solvents to aid in softening the polymer component. Such elastomer solvents can include methyl, glycerol or pentaerythritol esters of rosins or modified rosins, such as hydrogenated, dimerized or polymerized rosins or mixtures thereof. Examples of partially hydrogenated, dimerized or polymerized rosins or mixtures thereof.

Examples of elastomer solvents suitable for use herein include pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, and partially hydrogenated wood rosin, and partially hydrogenated methyl ester of rosin and mixtures thereof. Terpene resins, including polyterpene and mixtures thereof are also useful. The solvent can be employed in an amount ranging from about 10% to about 75% and preferably about 15% to about 50% by weight of the chewing gum composition.

A variety of traditional ingredients used as plasticizer, softeners or emulsifiers such as lanolin, lecithin, glyceryl monostearate, stearic acid, sodium stearate, potassium stearate, glyceryl triacetate, triacetin, glycerin and the like as well as natural waxes, petroleum waxes, paraffin waxes and microcrystalline waxes, can also be incorporated into the chewing gum composition to obtain a variety of desirable textures and consistency properties. These additional materials are generally employed in amounts of up to about 30% by weight, preferably about 1% to about 25% by weight and more preferably from about 3% to about 7% by weight of the final chewing gum component of the confection composition.

The chewing gum composition can additionally include conventional coloring agents such as titanium dioxide, and fillers such as dicalcium phosphate, aluminum hydroxide, alumina, aluminum silicates, talc, calcium carbonate, cellulose and combinations thereof. The chewing gum composition can also include flavoring, coloring and/or sweetening agents (both artificial and sugar as well as sugar alcohol types) more fully described below.

The gel-creme confectionery layer consists primarily of a hydrophilic composition comprised of glycerin and a hydrocolloid such as gelatin, xanthan gum, gum arabic, carrageenan and mixtures thereof. Preferably, the hydrocolloid of choice is gelatin. The particular gelatin of choice may be varied according to its bloom which directly affects the thickness or viscosity of the gel-creme. Generally, a gelatin with a bloom of from about 100–200 provides the best results. Glycerin is the predominant component of the gel creme confection and comprises from about 20% to about 50% by weight of the gel. Preferably from about 30% to about 40% is used, most preferably from about 33% to 38%. The hydrocolloid is incorporated in amounts of from about 2.0% to about 8.0% and preferably about 4.0%. Additional ingredients comprising the hydrophilic gel creme include sugar alcohols such as sorbitol, mannitol, maltitol and the like (5% to 15%), a fat component or vegetable oil such as palm oil, safflower oil, corn oil and the like (1.0% to 6.0%), lecithin (0.3% to 0.8%), fillers such as again, sugar alcohols, calcium phosphate, dicalcium phosphate, talc and the like as well as the flavors and sweeteners of choice.

The hydrophilic nature of the gel-creme confection is important in that it allows for the immediate up front release of flavoring and sweetening agents while the more hydrophobic nature of the chewing gum layers provides for a more sustained, delayed release of flavors and sweeteners. This allows for the incorporation of a first flavoring agent or sweetener for up-front flavor release followed by a subsequent, delayed release of a second flavoring agent or sweetener or multiple variations thereof if multiple layers are prepared. Examples of suitable dual flavor systems could comprise chocolate and mint, different fruit flavors such as lemon-lime or strawberry-pineapple, vanilla-creme and fruit and the like.

Natural and synthetic flavoring agents well known to the chewing gum art may be added in the effective amounts desired to the chewing gum and gelatin creme components of the instant invention. These flavoring agents may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds, and cassia oil. Also useful are artificial, natural or synthetic fruit flavors such as vanilla, cocoa, and citrus oil, including lemon, orange, grape, lime and grapefruit and fruit essences including apple, pear, peach, strawberry, raspberry, cherry, plum, pineapple, apricot and so forth. These flavoring agents such as peppermint, menthol, artificial vanilla, cinnamon derivatives, and various fruit flavors, whether employed individually or in admixture.

The amount of flavoring agent employed in both the gum and gel compositions is normally a matter of preference subject to such factors as flavor type, gum base type and strength desired. In general, amounts of about 0.5% to about 3.0% by weight of the final chewing gum composition are useable with amounts of about 0.3% to about 1.5% being preferred and about 0.7% to about 1.2% being most preferred.

The amount of sweetener used is also a matter of choice depending upon the sweeteners sought to be delivered by both the hydrophilic gel-creme component (up-front release) and the more hydrophobic chewing gum component (delayed and sustained release). The levels used may be from about 0.001% to about 90% of the total weight of the composition. Higher levels of from about 5.0% to 20% will be effective for the natural water soluble sugars and sugar alcohols while lower levels of from about 0.001% to 5.0% are sufficient for the high intensity low calorie sweeteners such as aspartame, saccharin, Sucrolose and the like. Suitable sweeteners include water soluble sweetening agents such as xylose, rebose, glucose, mannose, galactose, fructose, sucrose, maltose, invert sugar, partially hydrolyzed starch, corn syrup solids and the like, and high intensity water soluble sweeteners such as dihydrochalcones, monellin, steviosides, glycyrrhizin, sorbitol, xylitol, mannitol, maltitol, hydrogenated starch hydrolysate, saccharin acid, saccharin salts, cyclamate salts, acesulfame-K, L-aspartyl-L-phenylalanine methyl ester, L-alpha-aspartyl-N-(2,2,4,4-tetramethyl-3-thietanyl)-D-alaninamide hydrate, Sucralose (a chlorinated derivative of sucrose), thaumatin, and mixtures thereof.

The coloring agents are used in amounts effective to produce the desired color. Through the use of different coloring agents for the chewing gum layers as opposed to the gel-creme layers, an aesthetically appealing, multi-colored laminate gum confection may be prepared. For example, red-white-red, yellow-blue-yellow and other similar color combinations are possible. Different colors may also be used to suggest the flavor contained therein such as red for cherry, brown for chocolate, yellow for lemon and the like.

The coloring agents (colorants) useful in the present invention include the pigments such as titanium dioxide, which may be incorporated in amounts of up to about 2.0% by weight, and preferably less than about 1.0% by weight. Colorants may also include natural food colors and dyes suitable for food, drug and cosmetic applications. These colorants are known as F.D. & C. dyes and lakes. The materials acceptable for the foregoing spectrum of use are preferably water-soluble, and include indigoid dye, known as F.d., & C. Blue No. 2, which is the disodium salt of 5,5-indigotindisulfonic acid. Similarly, the dye known as F.D. & C Green No. 1 comprises a triphenylmethane dye and is the monosodium salt of 4-[4-N-ethyl-p-sulfobenzylamino]diphenylmethylene]-[1-N-p-sulfoniumbenzyl)-DELTA<2,5>-cyclohexadienimine]. A full recitation of all F. D. & C. dyes and their corresponding chemical structures may be found in the Kirk-Othmer Encyclopedia of Chemical Technology, at Volume 5, pages 857–884, which text is accordingly incorporated herein by reference.

The chewing gum composition is prepared as is known in the art by melting the gum base (approx. 20% to 50% by weight) to a molten flexible state when the flavoring agent (1.0 to 5%), sweetener (1.0–50%), emulsifier (0.1%–0.6%), plasticizer (0.1 to 0.6%), fillers (0.5 to 6.0%) and coloring agents (0.01 to 2.0%) are added and slowly mixed until an homogenous blend is obtained.

The multi-layer gum gel confection is prepared using an extruder that has been modified so that there are at least three outlet ports or nozzles, one for each layer. Suitable models for modification are those available through Babex-Hutt, Stuttgart, Germany; Togum, Strasbourg, France; Werner Pfleiderer, Ramsey, N.J.; and Model #KM4, Karlsruhl, Germany.

The chewing gum composition is fed into the extruder at a temperature of no greater than 55° C. in order to maintain the proper plasticity. The gel-creme confection is likewise fed into its compartment of the extruder at a temperature of no less than from about 40° C. to about 60° C. In a three layer gum confection, the layers are co-extruded so that the gel creme confection is essentially sandwiched between the two chewing gum layers. It must be realized however, that although a three layer chewing gum gel confection is the preferred embodiment of the present invention, any number of outlet nozzles may be conceivably modified onto the known extruders discussed, supra, and therefore any number of multiple-layers is not outside the realm of possibility. Whereas the multi-layered gum is generally comprised of layers of gum and gel creme in ratios of 1:1 respectively, amounts of from about 1:4 to about 2:1 are also sufficient. The gum layers are extruded at an exit temperature of no greater than 25° C. while the gel creme exit temperature should be no greater than about 15° C. for proper consistency and texture. The layered gum is then cooled, scored into pieces as is known in the art, sized according to choice and packaged by standard procedures and machinery that is commercially available.

The following examples are provided to better define and set forth the manner of preparing the layered chewing gum gel creme confection of the present invention. They are for illustrative purposes only and it is recognized that although many minor variations and changes may be made with respect to the ingredients and process parameters, they are still considered to fall within the spirit and scope of the present invention as recited by the claims that follow.

EXAMPLE 1

Orange Mint Gum

The following ingredients were collected in their respective amounts for the preparation of a center fill gelatin creme.

| | |
|---|---|
| Glycerin | 350.0 gm. |
| Gelatin (200 bloom) | 40.0 gm. |
| Sorbitol solution (70%) | 75.0 gm. |
| Mannitol powder | 450.0 gm. |
| Aspartame | 0.5 gm. |
| Vegetable oil | 30.0 gm. |
| Orange flavor | 5.0 gm. |
| Lecithin | 3.0 gm. |
| Orange color - yellow #6 | 0.5 gm. |
| | 954.0 gm. |

The gelatin, glycerin and sorbitol were mixed together and heated to approximately 95° C. for one-half hour and then cooled to approximately 60° C. with continuous stirring using a standard blade mixer. The remaining ingredients were then added with continued mixing until a homogenous, viscous gelatinous mass was prepared.

A chewing gum composition was prepared using methods known in the art by combining the following ingredients.

| | |
|---|---|
| Gum base (Polyisobutylene) | 735.0 gms. |
| Gum base II (Butyl rubber) | 490.0 gms. |
| Glycerin | 500.0 gms. |
| Mannitol | 500.0 gms. |
| Sorbitol | 2675.0 gms. |
| Lecithin | 25.0 gms. |
| Peppermint Flavor | 87.5 gms. |
| Sucralose sweetener | 7.0 gms. |
| | 5019.5 gms. |

The gum base was melted at a temperature of approximately 80° C. to which the emulsifier and plasticizer is added. Once fluid and viscous upon mixing, the remaining ingredients are added and stirred until a continuous, homogenous chewing gum composition is obtained.

Both the chewing gum composition and gelatin creme were fed into a modified Babex Hutt Extruder, Stuttgart, Germany, at temperatures of approximately 50° C. and 45° C. respectively. The gum was extruded as two layers at an outlet temperature of about 22° C. while the gelatin creme was extruded as one layer sandwiched therebetween at a temperature of about 15° C. in amounts in ratios of from about 1:1:1 gum:gel:gum respectively. The product was then cooled and scored into approximately one-half inch pieces respectively.

A taste panel sampled the multi-layer chewing gum gel creme confection and found it to possess an initial soft chewy bite with an upfront burst of orange which gradually became more gummy in texture with a defined mint note as the gel creme dissipated and solubilized during the chew.

EXAMPLE II

Chocolate Mint Gum

The following ingredients were collected as in Example I.

| | |
|---|---|
| Glycerin | 350.0 gms. |
| Gelatin (200 bloom) | 25.0 gms. |
| Sorbitol solution (70%) | 150.0 gms. |
| Cocoa powder | 90.0 gms. |
| Lecithin | 5.0 gms. |
| Ethyl vanillin | 5.0 gms. |
| Encapsulated Sucralose sweetener | 10.0 gms. |
| Mannitol Powder | 350.0 gms. |
| Water | 15.0 gms. |
| | 1000.0 gms. |

The glycerin, gelatin and sorbitol solution were mixed separately as in Example I and the remaining ingredients subsequently added as before.

The gum base as prepared in Example I was again used and the two components, gel and gum were extruded as before. A three layered gelatin gum confection was extruded and scored. When sampled, it also provided an initial chewy bite which became more gummy in texture after several minutes. A distinct, up-front and continuous chocolate mint flavor was perceived.

What we claim is:

1. A multi-layered chewing gum confection comprising:
   a) at least two separate layers of a soft chewing gum composition comprising chewing gum base, flavoring agents, sweetening agents, emulsifiers, bulking agents and fillers and;
   b) at least one layer of a hydrophilic confectionery gel-creme sandwiched therebetween.

2. The multi-layer chewing gum confection of claim 1 wherein the chewing gum is a sugared or sugarless chewing gum.

3. The multi-layer chewing gum confection of claim 2 wherein said hydrophilic gel-creme is comprised of a hydrocolloid and glycerin.

4. The multi-layered chewing gum confection of claim 3 wherein said hydrocolloid is selected from the group comprising gelatin, xanthan gum, gum arabic, carrageenan and mixtures thereof.

5. The multi-layer chewing gum confection of claim 4 wherein said hydrophilic gel-creme further comprises sweeteners, flavors, fats, sugar alcohols, colorants and fillers.

6. The multi-layer chewing gum confection of claim 5 wherein said soft chewing gum layers are comprised of from about 20% to about 50% by weight gum base, from about 1.0% to about 2.0% flavor, 0.1% to about 6.0% emulsifiers, 0.1% to about 0.6% plasticizers and from about 0.001% to about 90% sweetener.

7. The multi-layer chewing gum confection of claim 6 wherein said hydrocolloid comprises from about 2.0% to about 8.0% by weight of the total gel-creme composition.

8. The multi-layer chewing gum confection of claim 7 wherein said glycerin comprises from about 20% to about 50% by weight of the total gel-creme composition.

9. The multi-layer chewing gum confection of claim 8 wherein said sugar alcohol comprises from about 5.0% to about 15% by weight of the gel-creme composition.

10. The multi-layer chewing gum of claim 9 wherein said bulking agent comprises from about 30% to about 60% of the gel-creme composition.

11. The multi-layer chewing gum confection of claim 10 wherein said layers of chewing gum contain and release at least one first flavor and said gel-creme contains and releases at least one second, different flavor.

12. The multi-layer chewing gum confection of claim 11 wherein said flavors comprise flavoring agents and sweetening agents.

13. The multi-layer chewing gum confection of claim 12 wherein the sweetening agent is selected from the group consisting of water-soluble sweetening agents, water-soluble artificial sweetening agents, dipeptide-based sweetening agents, water-soluble sweetening agents derived from naturally occurring water-soluble sweetening agents, protein based sweeteners, and mixtures thereof.

14. The multi-layer chewing gum confection of claim 13 wherein said sweetening agent is present in an amount of about 0.001% to about 5.0% by weight of the final chewing gum composition.

15. The multi-layer chewing gum confection of claim 14 wherein said sweetening agent is selected from the group consisting of: xylose, rebose, glucose, mannose, galactose, fructose, sucrose, maltose, invert sugar, partially hydrolyzed starch, corn syrup solids, dihydroohalcones, monellin, steviosides, glycyrrhizin, sorbitol, xylitol, mannitol, maltitol, hydrogenated starch hydrolysate, saccharin acid, saccharin salts, cyclamate salts, acesulfame-K, L-aspartyl-L-phenylalanine methyl ester, L-alpha-aspartyl-N-(2,2,4,4-tetramethyl-3-thietanyl)-D-alaninamide hydrate, Sucralose, thaumatin, and mixtures thereof.

16. The multi-layer confection of claim 15 wherein the flavoring agent is selected from the group consisting of synthetic flavor oils; flavoring aromatics; oleo resins; extracts derived from plants, leaves, flowers, and fruits; fruit essences; and mixtures thereof.

17. The multi-layer confection of claim 16 wherein said flavoring agent is present in amounts of about 0.5% to about 3.0% by weight of the final chewing gum composition.

18. The chewing gum confection of claim 17 where the ratio by weight of said chewing gum composition to said gel creme composition is from about 1:4 to about 2:1, respectively.

19. The chewing gum confection of claim 18 wherein said ratio is about 1:1 to about 2:1, respectively.

20. The multi-layer chewing gum confection of claim 19 wherein said gelatin has a characteristic bloom of from about 100 to about 200.

21. The chewing gum confection of claim 19 wherein said chewing gum and said gel-creme are arranged in multiple alternate parallel layers.

22. A method for the preparation of a multi-layer chewing gum gel-creme confectionery composition comprising:
   a) extruding a first layer of chewing gum at suitable temperatures and pressure;
   b) simultaneously extruding a second layer of a hydrophilic gel-creme upon said first gum layer;
   c) co-extruding a second chewing gum layer upon said first and second layers at suitable temperature and pressure so that said gel-creme is sandwiched between said chewing gum layers.

23. The method of claim 22 wherein said chewing gum is comprised of from about 20% to about 50% by weight of gum base, from about 1.0% to about 2.0% flavor ingredient, from about 0.1% to about 0.6% emulsifiers, from about 1.0% to about 0.6% plasticizer, from about 0.001% to about 90% sweetening agents and mixtures thereof.

24. The method of claim 23 wherein the gum base comprises an elastomer selected from the group consisting of natural rubber, synthetic rubber and mixtures thereof.

25. The method of claim 24 wherein the gum base elastomer is selected from the group consisting of: chicle, crown gum, nispero, rosidinha, jelutong, pendare, perillo, niger gutta, tunu, balata, gutta-percha, lechicapsi, sorva, butadiene-styrene copolymers, polyisobutylenes, butyl rubber, isobutylene-isoprene copolymers, polyethylenes, polyvinylacetates, and mixtures thereof.

26. The method of claim 25 wherein said hydrophilic gel-creme is comprised of a hydrocolloid and glycerin.

27. The method of claim 26 wherein said hydrocolloid comprises from about 2.0% to about 8.0% by weight of the total gel-creme composition.

28. The method of claim 27 wherein said glycerin comprises from about 20% to about 50% by weight of the total gel-creme composition.

29. The method of claim 28 wherein said hydrocolloid is selected from the group comprising gelatin, xanthan gum, gum arabic, carrageenan and mixtures thereof.

30. The method of claim 29 wherein said hydrophilic gelatin creme further comprises sweetening agents, flavoring agents, fats, sugar alcohols, fillers and mixtures thereof.

31. The method of claim 30 wherein said gel-creme is injected into said extruder at a temperature of not less than from about 40° C. to about 60° C. and is extruded at a temperature of no greater than about 15° C.

32. The method of claim 31 wherein said chewing gum composition is injected into said extruder at a temperature of not less than about 55° C. and is extruded at a temperature of no greater than 20° C.

33. The method of claim 32 wherein at least one first flavor is incorporated into said chewing gum layers and at least one different flavor is incorporated into said gel-creme.

34. The method of claim 33 wherein said flavors are comprised of flavoring agents and sweetening agents.

35. The method of claim 34 wherein said sweetening agent is selected from the group consisting of: xylose, rebose, glucose, mannose, galactose, fructose, sucrose, maltose, invert sugar, partially hydrolyzed starch, corn syrup solids, dihydrochalcones, monellin, steviosides, glycyrrhizin, sorbitol, xylitol, mannitol, maltitol, hydrogenated starch hydrolysate, saccharin acid, saccharin salts, cyclamate salts, acesulfame-K, L-aspartyl-L-phenylalanine methyl ester, L-alpha-aspartyl-N-(2,2,4,4-tetramethyl-3-thietanyl)-D-alaninamide hydrate, a chlorinated derivative of sucrose, thaumatin, and mixtures thereof.

36. The method of claim 35 wherein said flavoring agent is selected from the group consisting of: synthetic flavor oils; flavoring aromatics; oleo resins; extracts derived from plants, leaves, flowers and fruit essences; and mixtures thereof.

37. The method of claim 36 wherein said hydrocolloid is gelatin with a bloom of from about 100 to about 200.

* * * * *